(12) United States Patent
Pohlack et al.

(10) Patent No.: US 9,286,111 B2
(45) Date of Patent: Mar. 15, 2016

(54) ACCESSING TIME STAMPS DURING TRANSACTIONS IN A PROCESSOR

(71) Applicant: Advanced Micro Devices, Inc., Sunnyvale, CA (US)

(72) Inventors: Martin T. Pohlack, Dresden (DE); Stephan Diestelhorst, Dresden (DE)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 324 days.

(21) Appl. No.: 13/870,145

(22) Filed: Apr. 25, 2013

(65) Prior Publication Data
US 2013/0290965 A1 Oct. 31, 2013

Related U.S. Application Data

(60) Provisional application No. 61/639,708, filed on Apr. 27, 2012.

(51) Int. Cl.
G06F 9/46 (2006.01)
G06F 7/38 (2006.01)

(52) U.S. Cl.
CPC ............... *G06F 9/466* (2013.01); *G06F 9/467* (2013.01)

(58) Field of Classification Search
None
See application file for complete search history.

(56) References Cited

U.S. PATENT DOCUMENTS

2011/0302143 A1* 12/2011 Lomet .......................... 707/704

* cited by examiner

*Primary Examiner* — Meng An
*Assistant Examiner* — Bing Zhao
(74) *Attorney, Agent, or Firm* — Park, Vaughan, Fleming & Dowler LLP

(57) ABSTRACT

The described embodiments include a processor that handles operations during transactions. In these embodiments, the processor comprises one or more cores. During operation, at least one core is configured to monitor the acquisition of time stamps during transactions. The at least one core is further configured to prevent the acquisition of time stamps that meet predetermined conditions.

18 Claims, 10 Drawing Sheets

| TSC 206 | TRANSACTION 202 | TRANSACTION 204 |
|---|---|---|
| 208 | BEGIN | BEGIN |
| 210 | T1 = RDTSCP | |
| 212 | | X1 = RDTSCP |
| 214 | T2 = RDTSCP | |
| 216 | END | END |

TABLE 200

INITIALLY: C = 0

| TSC 306 | TRANSACTION 302 | TRANSACTION 304 |
|---------|-----------------|-----------------|
| 308     | BEGIN           | BEGIN           |
| 310     |                 | X1 = RDTSCP     |
| 312     | C = 1           |                 |
| 314     | T1 = RDTSCP     |                 |
| 316     |                 | LC = C          |
| 318     | END             | END             |

TABLE 300

FIG. 3

INITIALLY: C = 0

| TSC 406 | NON-TRANSACTION 402 | TRANSACTION 404 |
|---------|---------------------|-----------------|
| 408     |                     | BEGIN           |
| 410     |                     | X1 = RDTSCP     |
| 412     | NT1 = RDTSCP        |                 |
| 414     | C = 1               |                 |
| 416     |                     | LC = C          |
| 418     |                     | END             |

TABLE 400

FIG. 4

INITIALLY: C = 0

| TSC 506 | TRANSACTION 502 | TRANSACTION 504 |
|---------|-----------------|-----------------|
| 508     |                 | BEGIN           |
| 510     |                 | X1 = RDTSCP     |
| 512     | NT1 = RDTSCP    |                 |
| 514     | BEGIN           |                 |
| 516     | END             |                 |
| 518     | C = 1           |                 |
| 520     |                 | LC = C          |
| 522     |                 | END             |

TABLE 500

FIG. 5

ACCESSING TIME STAMPS DURING TRANSACTIONS IN A PROCESSOR

RELATED APPLICATION

The instant application is a non-provisional application from, and hereby claims priority under 35 U.S.C. §120 to, U.S. provisional patent application No. 61/639,708, which is titled "Processor System and Methods for Safely Accessing Time Stamps in Transactions," by inventors Martin T. Pohlack and Stephan Diestelhorst, which was filed on 27 Apr. 2012, and which is incorporated by reference.

BACKGROUND

1. Field

The described embodiments relate to computing devices. More specifically, the described embodiments relate to accessing time stamps during transactions in a processor in a computing device.

2. Related Art

In some existing processors, one or more instructions in program code may be grouped into what is called a "critical section." In these processors, before executing a critical section, an executing entity (e.g., processor core, thread, etc.) acquires a lock (e.g., by writing a 1 to a lock variable). The entity then executes the program code in the critical section, releasing the lock (e.g., by writing a 0 to the lock variable) when finished executing the critical section. The lock, once acquired, prevents the concurrent execution of the critical section or another critical section that is protected by the same lock by another entity (e.g., processor core, thread, etc.). In other words, in these processors, instructions in two or more critical sections that are protected by the same lock are mutually exclusive and thus should not be executed concurrently. This mutual exclusion property of critical sections can be referred to as "single lock atomicity" or "SLA."

Some existing processors support "transactional memory." Transactional memory is typically implemented in a processor by enabling entities (e.g., processor cores, threads, etc.) on the processor to execute sections of program code in "transactions," during which program code is executed normally, but transactional operations are prevented from permanently effecting the architectural state of the processor. For example, memory accesses (reads and writes) are allowed during transactions, but transactional writes may be held locally and prevented from being committed to one or more levels of a memory hierarchy in the processor during the transaction. In these processors, during transactions, memory accesses from other entities are monitored to determine if a memory access from another entity interferes with a transactional memory access (e.g., if another entity writes data to a memory location read during the transaction, etc.) and transactional operations are monitored to ensure that an error condition has not occurred. If an interfering memory access or an error condition is detected during the transaction, the transaction is aborted, a pre-transactional state of the entity is restored, and the entity may retry the transaction (or some error-handling routine may be performed). Otherwise, if the entity completes the transaction by executing the section of program code without encountering an interfering memory access or an error condition, the entity commits the transaction, which includes committing the held transactional operations (writes, state changes, etc.) to the architectural state of the processor.

In some transactional memory processors, to enable more efficient execution, the above-described critical sections are executed in transactions. In these processors, upon encountering a critical section, the processor does not acquire the lock (called "lock elision"), but, instead, executes the critical section in a transaction, perhaps concurrently with one or more other transactions that are being performed for critical sections that are protected by the same lock. The replacement of lock-based critical sections with transactions generally provides the appearance to entities on the processor that the critical sections have not been executed concurrently. However, in certain cases, this appearance can be lost and hence violations of SLA can become apparent. For example, some processors provide instructions such as read time stamp counter and processor (or "RDTSCP") that enable entities to acquire a current time in the processor (a "time stamp"). These time stamps are often used to determine order between events. Because time-stamp acquisition instructions can appear in critical sections, when two or more critical sections are executed concurrently in transactions, one or more of the transactions could acquire time stamps that indicate/prove that the critical sections were not executed mutually exclusively.

One possible technique for handling a transactional time stamp acquisition is to simply abort the transaction upon detecting an instruction that acquires a time stamp. However, because time stamp acquisition occurs fairly frequently in program code, accepting this simple solution can lead to inefficient operation (i.e., a larger percentage of transactions than need to be may be aborted).

SUMMARY

The described embodiments include a processor that handles operations during transactions. In these embodiments, the processor comprises one or more cores. During operation, at least one core is configured to monitor the acquisition of time stamps during transactions. The at least one core is further configured to prevent the acquisition of time stamps that meet predetermined conditions.

BRIEF DESCRIPTION OF THE FIGURES

FIG. 3 illustrates a case in which linearizability is violated because a mismatch exists between a memory access order and a time stamp order for transactions.

FIG. 4 illustrates a case in which strong temporal isolation is not observed.

FIG. 5 illustrates a case showing that strong temporal isolation should be used to avoid an apparent violation of SLA.

Throughout the figures and the description, like reference numerals refer to the same figure elements.

DETAILED DESCRIPTION

Figures 1, 2:
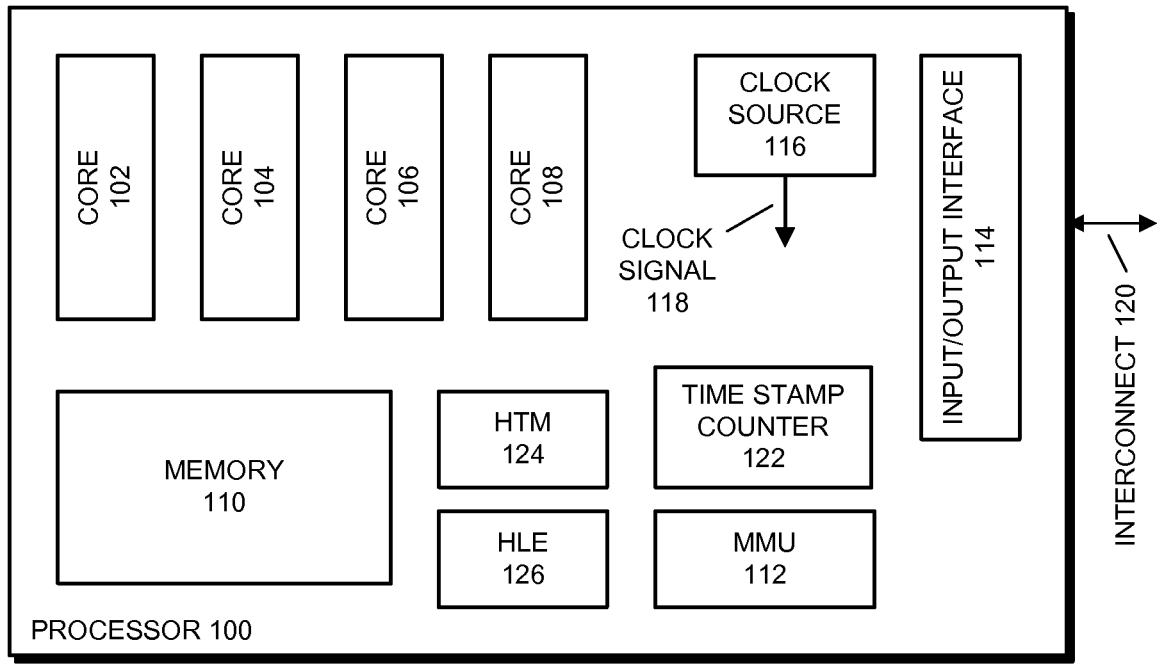
FIG. 1 presents block diagram of a processor in accordance with some embodiments.
FIG. 2 illustrates a case in which linearizability is violated because an overlap of time stamp intervals exists between transactions.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., processor 100, core 102, etc. in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium may include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, microcontrollers, graphics processors (GPUs)/graphics processor cores, Accelerated Processing Units (APUs), pipelines, and/or other programmable-logic devices. When such hardware modules are activated, the hardware modules perform some or all of the operations. In some embodiments, the hardware modules include one or more general-purpose circuits that are configured by executing instructions (program code, microcode/firmware, etc.) to perform the operations.

In some embodiments, a data structure representative of some or all of the structures and mechanisms described herein (e.g., processor 100, a core, and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

In the following description, terms such as "first" and "second," and the like may be used to distinguish one entity or action from another entity or action without necessarily requiring or implying an ordered relationship between the indicated entities or actions. Numerical ordinals such as "first," "second," etc. therefore simply indicate different individual entities or actions from a plurality of entities or actions, and do not necessarily indicate an order or sequence.

TERMINOLOGY

In the following description, some of the following terms may be used in describing embodiments. Note that this section provides basic/general explanation of the meaning of the terms, however, the explanations of the terms are simplified—some of the terms (e.g., hardware transactional memory, etc.) may have significant additional aspects that are not recited herein for clarity and brevity.

Critical section: in some embodiments, a critical section is a section of program code that comprises a lock acquisition instruction, one or more instructions to be executed, and a lock release instruction. When executing a critical section, the executing entity (e.g., processor core, thread, etc.) first executes the lock instruction, which causes the entity to acquire the lock (e.g., to write a first predetermined value such as 1 to a lock variable). The entity then executes the one or more instructions from the critical section. After executing the one or more instructions from the critical section, the entity executes the lock release instruction, which causes the entity to release the lock (e.g., to write a second predetermined value such as 0 to the lock variable).

Single lock atomicity ("SLA"): in some embodiments, a rule that, as long as an acquired lock is held by an entity executing a critical section, other entities should be prevented from executing the critical section and/or any other critical section that is protected by the same lock. This may also be called "mutual exclusion" for critical sections.

Hardware transactional memory ("HTM"): in some embodiments, transactional memory is implemented in a processor (e.g., processor 100) by enabling entities (e.g., processor cores, threads, etc.) on the processor to execute sections of program code in "transactions," during which program code is executed normally, but transactional operations are prevented from permanently effecting the architectural state of the processor. For example, memory accesses (reads and writes) are allowed during transactions, but transactional writes may be held locally and prevented from being committed to one or more levels of a memory hierarchy in the processor during the transaction. In these processors, during transactions, memory accesses from other entities are monitored to determine if a memory access from another entity interferes with a transactional memory access (e.g., if another of the entities writes data to a memory location read during the transaction, etc.) and transactional operations are monitored to ensure that an error condition has not occurred. If an interfering memory access or an error condition is detected during the transaction, the transaction is aborted, a pre-transactional state of the entity is restored, and the entity may retry the transaction (or some error-handling routine may be performed). Otherwise, if the entity completes the transaction by executing the section of program code without encountering an interfering memory access or an error condition, the entity commits the transaction, which includes committing the held transactional operations (writes, state changes, etc.) to the architectural state of the processor (thereby making the results of the held transactional operations visible to and usable by other entities on the processor).

Hardware lock elision ("HLE"): in some embodiments, a processor (e.g., processor 100) uses HTM mechanisms to execute critical sections in transactions. In these embodiments, the processor ignores the lock acquisition instructions at the beginning of critical sections (and hence does not acquire the corresponding lock—herein called "lock elision") and instead executes the critical sections in transactions. In these embodiments, the lock acquisition instruction and the lock release instruction (which is also ignored) serve as indicators of the start and end/commit of a transaction for the critical section. As with other types of transactions, in some embodiments, the processor may execute a transaction for a critical section concurrently with one or more other transactions that are being performed for critical sections that are protected by the same lock. During the transaction for the critical section, the processor monitors transactional memory accesses and operations and aborts the transaction for the critical section upon encountering an interfering memory access or error condition. In some embodiments, as described herein, the processor also monitors the acquisition of time stamps during these transactions and prevents certain types of time-stamp acquisition.

Overview

The described embodiments include a processor that comprises hardware transactional memory (HTM) mechanisms for executing program code using transactions. To improve the performance of the processor when executing lock-protected critical sections in program code, the HTM mechanisms are used for hardware lock elision (HLE), which enables the execution of critical sections in transactions. This execution of critical sections in transactions includes the concurrent execution of multiple critical sections that are protected by the same lock in transactions, an operation that was not possible using traditional lock-based critical sections.

Because critical sections are generally bound by a requirement (single lock atomicity or SLA) that they appear to have been executed mutually exclusively, improper use of HLE can result in violations of SLA becoming apparent. For example, when transactions are used to execute two or more critical sections that include time-stamp acquisition instructions such as read time stamp counter (RDTSC), read time stamp counter and processor (RDTSCP), etc., a violation of SLA can become apparent when the time-stamp acquisition instructions (perhaps in combination with other transactional or non-transactional instructions such as memory access instructions) result in time stamps that show that the critical sections were executed concurrently. However, the described embodiments monitor the execution of transactions with time-stamp acquisition instructions and perform various operations such as aborting transaction(s), etc. to avoid a situation where time stamps could be used to determine that the critical sections were executed concurrently.

Processor

FIG. 1 presents a block diagram illustrating a processor 100 in accordance with some embodiments. Processor 100 is generally a device that performs computational operations. As shown in FIG. 1, processor 100 comprises cores 102-108, system memory 110, memory management unit 112, input/output interface 114, clock source 116/clock signal 118, time stamp counter 122, hardware transactional memory mechanism ("HTM") 124, and hardware lock elision mechanism ("HLE") 126. Processor 100 is coupled to interconnect 120.

Each of cores 102-108 includes a computational mechanism such as a central processing unit (CPU), a graphics processing unit (GPU), an Accelerated Processing Unit (APU), and/or an embedded processor that is configured to perform computational operations in processor 100.

Memory 110 comprises memory circuits that form a "main memory" of processor 100. Memory 110 is used for storing instructions and data for use by the processor cores 102-108 and other functional blocks on processor 100. In some embodiments, main memory 110 is fabricated from one or more of static random access memory (SRAM), dynamic random access memory (DRAM), double data rate synchronous DRAM (DDR SDRAM), and/or other types of memory circuits. Memory management unit 112 controls access to memory 110 and external memory (not shown) accessed via the input/output (I/O) interface 114 and an interconnect 120.

Clock source 116 provides a clock signal 118 that is generally used for synchronizing operations on processor 100. In some embodiments, clock signal 118 is used for maintaining a current time on processor 100.

Time stamp counter 122 is a high-resolution counter that is used for determining time stamps in processor 100. In some embodiments, time stamp counter 122 is generated from/based on clock signal 118. During operation, upon one of cores 102-108 executing a time-stamp acquisition instruction such as a read time stamp counter and processor ("RDTSCP") instruction, processor 100 acquires a current time stamp (which may be a representation of a current time in the processor or a time derived from the current time) from time stamp counter 122 and returns the time stamp to the requesting core. As described in more detail below, in some embodiments, the acquisition of time stamps during transactional execution of critical sections is subject to various constraints.

Hardware transactional memory mechanisms ("HTM") 124 includes functional blocks, circuits, components, etc. that are used for performing functions associated with executing program code using hardware transactional memory. For example, HTM 124 may include one or more mechanisms for recording when program code is being executed transactionally, one or more mechanisms for retaining a pre-transactional state of some or all of processor 100, one or more mechanisms for keeping track of transactional and non-transactional memory accesses and/or error conditions, one or more mechanisms for keeping track of time-stamp acquisition instructions encountered in transactions, etc. Note that, although shown in a single location in FIG. 1, in some embodiments, some or all of HTM 124 is located elsewhere in processor 100. For example, in some embodiments, each core 102-108 includes an independent HTM 124 for executing program code on the core in transactions.

Hardware lock elision mechanism ("HLE") 126 includes one or more functional blocks, circuits, components, etc. that are used for eliding (removing) locks from program code being executed by processor 100. In some embodiments, critical sections in program code comprise a lock acquisition instruction, one or more instructions to be executed, and a lock release instruction. In these embodiments, HLE 126 can remove the lock instructions (e.g., cause processor 100 to ignore the lock acquisition and lock release instructions, etc.), and can cause processor 100 to execute the critical sections in transactions (including concurrently executing two or more critical sections protected by the same lock in transactions). In some embodiments, when executing critical sections in transactions, processor 100 uses the techniques herein described to avoid creating apparent violations of SLA for the critical sections. Note that, although shown in a single location in FIG. 1, in some embodiments, some or all of HLE 126 is located elsewhere in processor 100. For example, in some embodiments, each core 102-108 includes an independent HLE 126 for executing program code on the core.

Although processor 100 is presented in FIG. 1 with certain functional blocks/devices (i.e., cores 102-108, memory 110, etc.), processor 100 has been simplified for the purpose of this description; in some embodiments, processor 100 includes more or fewer functional blocks. For example, in some embodiments, processor 100 includes a different number of cores, e.g., 1, 7, 16, etc. cores. As another example, in some embodiments, processor 100 comprises additional functional blocks/devices, such as power supplies/controllers, fans, mass-storage devices such as disk drives or large semiconductor memories, batteries, media processors, communication mechanisms, networking mechanisms, display mechanisms, etc.

Linearizability for Transactions

In the described embodiments, critical sections that are protected by the same lock can be executed concurrently in transactions using HLE. Generally, when executing critical sections transactionally, if it becomes possible to determine that the critical sections were executed concurrently, a violation of SLA becomes apparent. Thus, in some embodiments, the property of linearizability (or strict serializability) is maintained for transactions in which critical sections are executed. In order for transactions to meet linearizability, there should be an order to the transactions that is both sequential/serializable and in a proper precedence order with regard to operations performed by processor 100. The following examples illustrate linearizability for transactions.

Note that in FIGS. 2-3, "transactions" are described as performing operations such as setting variables to values and acquiring time stamps. However, in some embodiments, one or more instructions executed during the transaction (i.e., transactionally-executed memory access instructions, time-stamp acquisition instructions, etc.) perform the indicated operations. In addition, transactional beginnings and endings are indicated using "begin" and "end" in the tables in FIGS. 2-3. In some embodiments, transactions begin when processor 100 (e.g., core 102, etc.) encounters an indication in program code that a transaction should begin or end. For example, when executing critical sections in transactions, the processor may encounter a lock-acquisition instruction (begin) or a lock-release instruction (end) in program code. Generally, the operations shown in FIGS. 2-5 are performed by processor 100 in response to executing one or more corresponding instructions in program code.

FIG. 2 illustrates a case in which linearizability is violated because an overlap of time stamp intervals exists between transactions. Generally, an overlap of time stamp intervals occurs between two transactions "A" and "B" when it can be determined that transaction A has acquired two or more time stamps that form an interval in time during which transaction B acquired one or more time stamps. Thus, an overlap of time stamp intervals occurs when transaction B acquires one or more time stamps after the acquisition of a first time stamp by transaction A, but before the acquisition of a second time stamp by transaction A.

As shown in table 200 in FIG. 2, transaction 202 and transaction 204 both begin at time 208, as shown in time stamp counter ("TSC") 206. At time 210, transaction 202 acquires a time stamp from TSC 206 (by executing an RDTSCP instruction to acquire the time stamp) and sets the variable T1 equal to the value of the time stamp. At time 212, transaction 204 acquires a time stamp from TSC 206 and sets the variable X1 equal to the value of the time stamp. At time 214, transaction 202 again acquires a time stamp from TSC 206 and sets the variable T2 equal to the value of the time stamp. At time 216, both transaction 202 and transaction 204 end. In the example shown in FIG. 2, because transaction 202 acquired time stamps both before and after the acquisition of the time stamp by transaction 204 (and, thus, T1<X1<T2), a time stamp overlap has occurred between the transactions. There is therefore no sequential execution order for transactions 202 and 204, and these concurrent transactions violate linearizability.

FIG. 3 illustrates a case in which linearizability is violated because a mismatch exists between a memory access order and a time stamp order for transactions 302 and 304. Note that the variable C is initially equal to 0.

As shown in table 300 in FIG. 3, transaction 302 and transaction 304 begin at time 308, as shown in time stamp counter ("TSC") 306. At time 310, transaction 304 acquires a time stamp from TSC 306 (by executing an RDTSCP instruction to acquire the time stamp) and sets the variable X1 equal to the value of the time stamp. At time 312, transaction 302 sets a variable C equal to 1. At time 314, transaction 302 acquires a time stamp from TSC 306 and sets the variable T1 equal to the value of the time stamp. At time 316, transaction 304 sets a variable LC=C. At time 318, both transaction 302 and transaction 304 end. In the example shown in FIG. 3, because X1<T1 and LC=1, the access order for the time stamps is opposite the access order for the memory accesses. There is therefore no sequential execution order for transactions 202 and 204 and the transactions display an improper precedence order with regard to operations performed by processor 100. These concurrent transactions therefore violate linearizability.

Temporal Isolation for Transactions

When transactional execution is supported concurrently with non-transactional execution (i.e., where transactionally executed instructions can concurrently access the same data as non-transactionally executed instructions), various levels of isolation for transactions may be enforced. For "weak isolation," only transactional memory accesses made by other transactions have an effect on a given transaction. Thus, in a system in which weak isolation is enforced, when a memory location is read during a transaction, a non-transactional read or write of the memory location has no effect on the transaction, but a transactional write of the memory location effects the transaction (e.g., may be an interfering memory access). For "strong isolation," all memory accesses, both transactional and non-transactional, effect the transaction (e.g., may be interfering memory accesses).

The concept of isolation for transactions can be extended to temporal isolation for transactions as "weak temporal isolation" and "strong temporal isolation." For weak temporal isolation, time stamps in a given transaction should not form overlapping intervals with time stamps from other transactions or create inconsistent ordering between time stamps and operations (e.g., memory accesses, etc.) in the transactions. For strong temporal isolation, time stamps from either within or outside of transactions (i.e., time stamps acquired when executing instructions non-transactionally) should not fall into intervals from time stamps inside transactions or form inconsistent orderings with normal (i.e., non-transactional) memory accesses. Thus, transactions should demonstrate a combination of strong memory isolation and causal time stamp access with regard to other transactional and non-transactional memory accesses and time stamp acquisitions.

FIG. 4 illustrates a case in which strong temporal isolation is not observed. Note that, for the operations in FIG. 4, non-transaction 402 comprises instructions executed outside a transaction (e.g., during "normal" execution) concurrently with transaction 404. In addition, the variable C is initially equal to 0.

As shown in table 400 in FIG. 4, transaction 404 begins at time 408, as shown on time stamp counter ("TSC") 406. At time 410, transaction 404 acquires a time stamp from TSC 406 (by executing an RDTSCP instruction to acquire the time stamp) and sets the variable X1 equal to the value of the time stamp. At time 412, non-transaction 402 acquires a time stamp from TSC 406 (by executing an RDTSCP instruction to acquire the time stamp) and sets the variable NT1 equal to the value of the time stamp. At time 414, non-transaction 402 sets the variable C equal to 1. At time 416, transaction 404 sets variable LC equal to C. Transaction 404 then ends at time 418.

The pattern of transactional and non-transactional acquisition of time stamps and memory accesses shown in FIG. 4 does not violate either memory or time stamp order, nor does it produce overlapping time stamp intervals. In addition, the pattern of transactional and non-transactional acquisition of time stamps and memory accesses shown in FIG. 4 does not violate memory-based strong isolation semantics, because transaction 404 is ordered behind non-transaction 402's memory access from a memory perspective. However, strong temporal isolation, the combination of strong memory isolation and causal time stamp access (i.e., time stamp access order between transaction 404 and non-transaction 402) is not observed because, at the end of transaction 404, L=1 and X1<NT1.

A modification to the example in FIG. 4 demonstrates that weak temporal isolation is insufficient for maintaining the appearance of SLA when executing critical sections in transactions. FIG. 5 illustrates a case showing that strong temporal isolation should be used to avoid an apparent violation of SLA. The distinction between FIGS. 4 and 5 is the addition of the transaction (that starts at time 514 and ends at time 516), which is called "empty" for this example because the transaction includes no time-stamp acquisitions or memory accesses. Note that, the operations on the left side of table 500, despite being labeled "transaction 502," include both transactional and non-transactional operations.

As shown in table 500 in FIG. 5, transaction 504 begins at time 508, as shown on time stamp counter ("TSC") 506. At time 510, transaction 504 acquires a time stamp from TSC 506 (by executing an RDTSCP instruction to acquire the time stamp) and sets the variable X1 equal to the value of the time stamp. At time 512, a non-transactional time-stamp acquisition operation acquires a time stamp from TSC 506 and sets the variable T1 equal to the time stamp. The empty transaction 502 then begins at time 514 and ends at time 516. At time 518, a non-transactional operation sets the variable C equal to 1. At time 520, transaction 504 sets the variable LC equal to C. Transaction then ends at time 522.

Assuming SLA, if X1<T1, then transaction 504 should read the old value of C (and hence LC should equal 0) because transaction should have executed entirely before the empty transaction 502, which in turn executed before the update to C that occurs at time 518. Weak temporal isolation permits transaction 504 to read the modified variable C, resulting in an apparent violation of SLA for transaction 504. However, strong temporal isolation preserves the appearance required for transactions 502 and 504 in accordance with SLA. Thus, strong temporal isolation can be used to avoid potential exposure of the use of transactions to concurrently execute critical sections.

Constraints for Transactions

In existing systems, transaction pairs with overlapping execution spans (i.e., concurrent transactions) can be serialized in disagreement with the order of time stamps taken within the transactions, which can make a violation of SLA apparent when concurrent transactions are used for executing critical sections that are protected by the same lock. For example, in existing systems, time stamps are not altered within transactions to only show a fully serialized view, transactions are not aborted to hide un-serializable situations, and transaction serialization order is not influenced by taking time stamps within the transaction. To avoid these issues and enable proper concurrent execution of transactions for critical sections, some embodiments operate in accordance with at least one of the following constraints:

1. At all times, the set of currently active transactions should not include more than one transaction that (a) is to commit successfully and (b) includes a time-stamp acquisition instruction (e.g., RDTSC, RDTSCP, etc.);
2. Time-stamp acquisition instructions outside of transactions should be treated as mini-transactions (this constraint, in combination with constraint 1, helps to enforce to strong temporal isolation);
3. If a transaction "A" acquires more than one time stamp, no other transaction should be fully enclosed in the largest time-stamp interval within A. In other words, no second transaction "B" should start after the first time stamp in A and commit before the last time stamp in A; and
4. If a transaction "A" acquires more than one time stamp, no other transaction should execute concurrently to the largest time-stamp span within "A." In other words, no second transaction "B" should be active between the first time stamp in A and the last time stamp in A.

Figure 6:
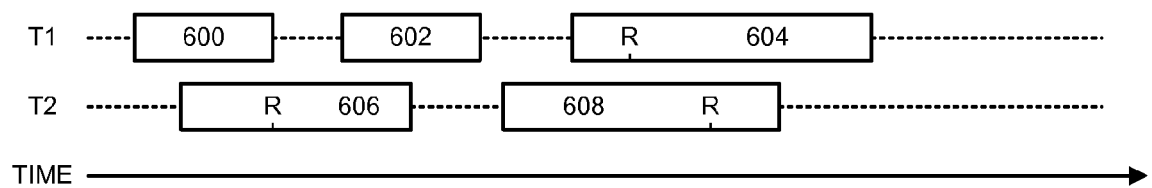
FIG. 6 presents a timeline diagram illustrating a violation of a constraint in accordance with some embodiments.
Figure 7:
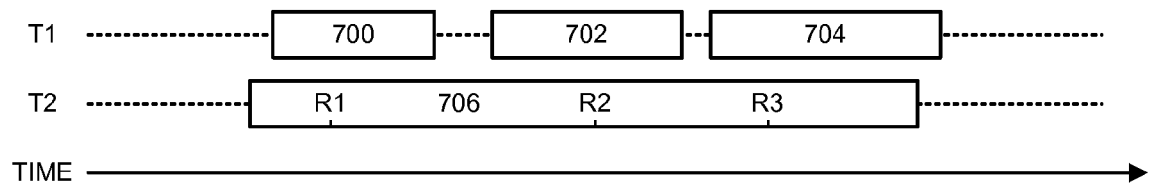
FIG. 7 presents a timeline diagram illustrating a violation of a constraint in accordance with some embodiments.
Figure 8:
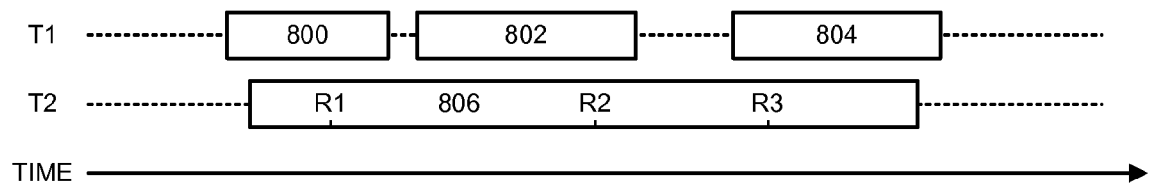
FIG. 8 presents a timeline diagram illustrating a violation of a constraint in accordance with some embodiments.

FIGS. 6-8 present timeline diagrams illustrating combinations of transactions for threads T1 and T2 (which are executed by a processor such as processor 100) that violate (or do not violate) the first, third, and fourth constraints. In FIGS. 6-8, each thread is indicated by a dashed line, with transactions shown as boxes and with each instance of a time-stamp acquisition instruction being indicated by R or R with a number, such as "R1." Time increases from left to right in FIGS. 6-8.

Note that, although two "threads" are used in describing the operations in FIGS. 6-8, in some embodiments other combinations of entities (cores, threads, etc.) on processor 100 may perform the operations. For example, in some embodiments, two cores (from cores 102-108) perform the operations.

FIG. 6 presents a timeline diagram illustrating a violation of the first constraint in accordance with some embodiments.

As shown in FIG. 6, thread T2 executes two transactions, 606 and 608, that include time-stamp acquisition instructions. During transaction 606, thread T1 executes two transactions, 600 and 602, neither of which includes a time-stamp acquisition instruction. Thus, there is no violation of the first constraint during transaction 606. However, while thread T2 is executing transaction 608, thread T1 executes a transaction, 604, that includes a time-stamp acquisition instruction. A violation of the first constraint therefore occurs during transaction 608.

FIG. 7 presents a timeline diagram illustrating a violation of the third constraint in accordance with some embodiments. As shown in FIG. 7, thread T1 executes three separate transactions, 700, 702, and 704, each of which is at least partially concurrent with a single transaction, 706, executed by thread T2 (and none of which includes a time-stamp acquisition instruction). During transaction 706, thread T2 executes three time-stamp acquisition instructions, R1, R2, and R3. Transactions 700 and 704 do not violate the third constraint because they are not fully enclosed in the largest time stamp interval in transaction 706 (i.e., R1 to R3). However, transaction 702 violates the third constraint because the second transaction is fully enclosed in the largest time stamp interval in transaction 706.

FIG. 8 presents a timeline diagram illustrating a violation of the fourth constraint in accordance with some embodiments. As shown in FIG. 8, thread T1 executes three separate transactions, 800, 802, and 804, each of which is at least partially concurrent with a single transaction, 806, executed by thread T2 (and none of which includes a time-stamp acquisition instruction). During transaction 806, thread T2 executes three time-stamp acquisition instructions, R1, R2, and R3. All of transactions 800, 804, and 806 violate the fourth constraint because they execute (at least partially) concurrently with the largest time-stamp span within transaction 806.

Processes for Executing Transactions

Figure 9:
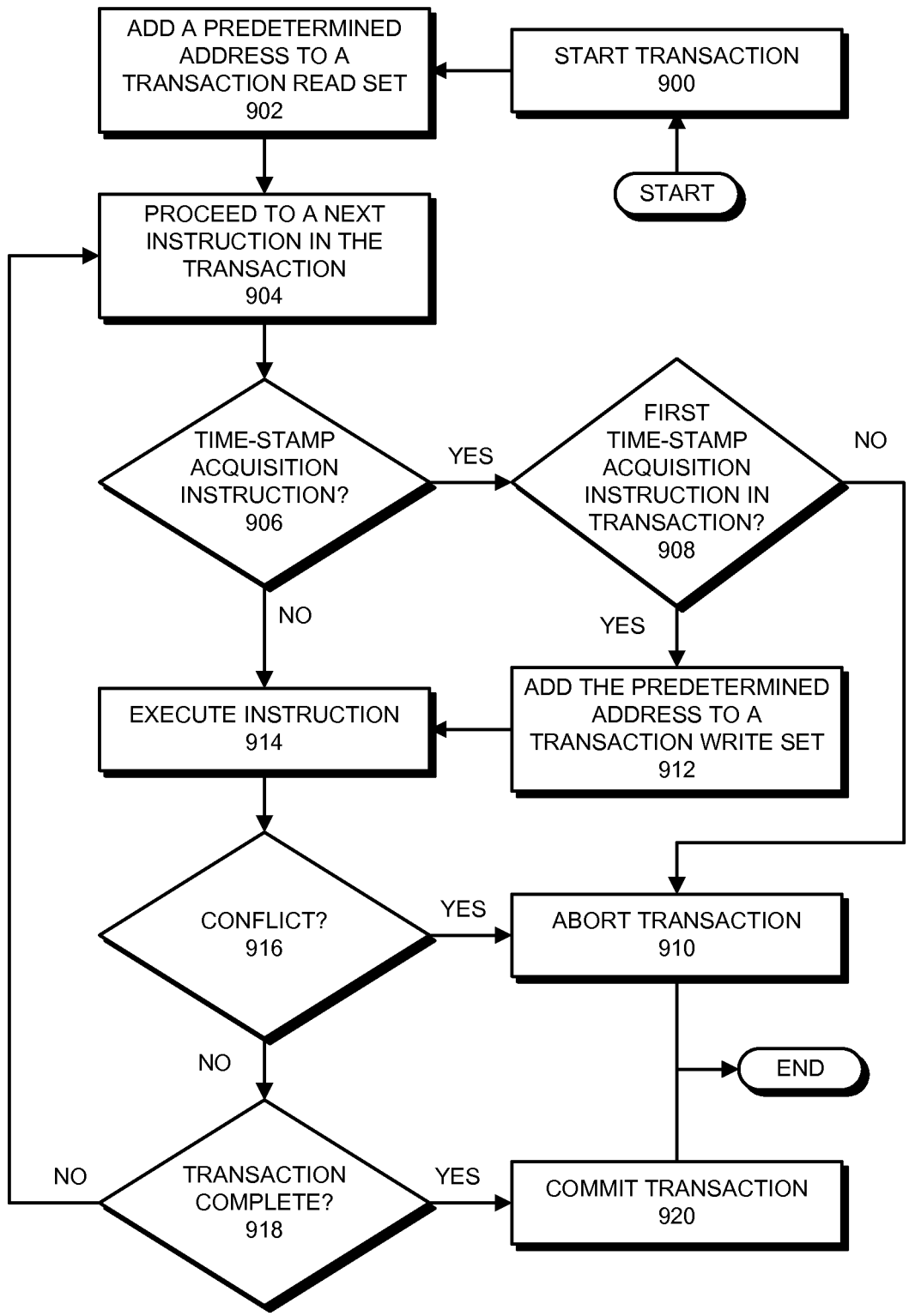
FIG. 9 presents a flowchart illustrating a process for executing a transaction in the presence of time-stamp acquisition instructions in accordance with some embodiments.

FIG. 9 presents a flowchart illustrating a process for executing a transaction in the presence of time-stamp acquisition instructions in accordance with some embodiments. The operations shown in FIG. 9 are presented as a general example of functions performed by some embodiments. The operations performed by other embodiments include different operations and/or operations that are performed in a different order. Additionally, although certain mechanisms are used in describing the process, in some embodiments, other mechanisms can perform the operations.

The process shown in FIG. 9 starts when core 102 in processor 100 starts a transaction (step 900). As described above, in some embodiments, core 102 starts a transaction upon encountering a lock-acquiring instruction at the beginning of a critical section of program code. In some of these embodiments, HLE 126 (some or all of which can, as described above, be located within core 102) detects the lock-acquisition instruction and causes core 102 to start the transaction (and elide/ignore the lock-acquisition instruction). Thus, in these embodiments, during the transaction, core 102 executes instructions from the critical section in the transaction.

When starting the transaction, core 102 adds a predetermined address to the transaction read set (step 902). In some embodiments, adding the address to the transaction read set comprises loading a copy of a cache line that includes the predetermined address to a cache in core 102 in a read state (e.g., in a "shared" coherency state, in which other cores/caches are permitted to concurrently hold copies in the "shared" coherency state). Loading the cache line as described causes HTM 124 to begin to monitor the address for interfering memory accesses. Because the cache line is in the read state, other transaction and non-transactional reads of the cache line are permitted (i.e., HTM 124 does not detect a read of the cache line as an interfering access). However, HTM 124 detects writes to the cache line, both transactional and non-transactional, as interfering accesses.

Although in some embodiments core 102 loads the cache line to add the memory address to the transaction read set, in some embodiments, adding the address to the transaction read set comprises updating a record in HTM 124 or elsewhere (without actually loading the cache line) and/or performing some other operation to cause HTM 124 to begin to monitor the address for interfering memory accesses.

In some embodiments, each of the cores 102-108 in the processor uses the predetermined address in the same way (i.e., adds the predetermined address to a transaction read set) to record when a transaction for a critical section has been started. In this way, each core's HTM 124 can monitor the location to determine if/when one of the cores adds the predetermined address to the write set, and can (if so configured) abort the transaction, as described below.

Core 102 then proceeds to a next instruction in the transaction (step 904) and determines if the instruction is a time-stamp acquisition instruction (step 906). If the instruction is a time-stamp acquisition instruction (step 906), core 102 determines if the instruction is the first time stamp instruction in the transaction (step 908). For example, if the instruction is a RDTSC, RDTSCP, or one or more other instruction(s) that cause core 102 to acquire a time stamp from time stamp counter 122, core 102 determines if the instruction is the first time-stamp acquisition instruction in the transaction.

If the time-stamp acquisition instruction is not the first time-stamp acquisition instruction, core 102 aborts the transaction (step 910). For example, when aborting the transaction, core 102 can halt processing instructions in the critical section, restore a pre-transactional state of processor 102 (e.g., register values, processor state variables, etc.), and retry executing the critical section in a subsequent transaction. In some embodiments, upon aborting the transaction a given number of times (e.g., 1, 3, etc.), core 102 performs an error-handling routine, which may include executing the transaction using the above-described locks (i.e., returning to the default behavior of the program code in the critical section), or setting one or more forward-progress mechanisms to enable a next attempt at the transaction to complete, etc.

By aborting the transaction in this way, core 102 operates in accordance with at least some of the above-described constraints. For example, the third constraint is met because the transaction, when the second time stamp would have been acquired, is aborted, thereby avoiding the case where another transaction could be fully enclosed in the largest time-stamp interval for the transaction.

Otherwise, if the time-stamp acquisition instruction is the first time-stamp acquisition instruction (step 908), core 102 adds the predetermined address to a transaction write set (step 912). In some embodiments, adding the address to the transactions write set comprises upgrading the previously-loaded copy of a cache line that includes the predetermined address from the read state to a write state (e.g., the "exclusive" or "modified" coherency state). Because the cache line has been upgraded to the write state, both other transaction and non-transactional reads or writes of the cache line are impermissible (i.e., HTM 124 detects both reads and writes of the cache line as interfering accesses). Similarly to adding the memory address to the transaction read set, in some embodiments, adding the address to the transaction write set comprises updating a record in HTM 124 or elsewhere (without actually operating on a local copy of the cache line).

Depending on the configuration of processor 100, adding the memory address to the transaction write set for core 102 can: (1) cause all entities in processor 100 executing transactions with the predetermined address in their read set to abort, or (2) cause core 102 to abort the transaction. For this example, it is assumed that processor 100 is configured so that all other transactions in processor 100 are aborted. By causing the abortion of the other transactions in this way, core 102 operates in accordance with at least some or all of the above-described constraints. For example, the first constraint is met because the transaction, when the first time stamp has been acquired, causes all other transactions to be aborted, thereby enforcing the constraint that the set of currently active transactions should not include more than one transaction that will commit successfully and includes a time-stamp acquisition instruction.

Core 102 then executes the instruction (step 914). As described above, the instruction may be a time-stamp acquisition instruction, which causes core 102 to request a time stamp from time stamp counter 122. However, the instruction may be some other instruction from program code. For example, the instruction may be a memory access instruction or another instruction that causes a conflict for the transaction (e.g., a memory access instruction that interferes with another transaction, an instruction that causes an error that is handled by aborting the transaction, etc.), in which case, core 102 aborts the transaction (step 910). Note that the core 102's transaction can be aborted (step 910) if another transaction upgrades a cache line with the predetermined memory address to the write set (e.g., if another transaction encounters a first time-stamp acquisition instruction).

If the transaction is complete (i.e., if the instruction was the last instruction in the critical section) (step 918), core 102 commits the transaction (step 920). When committing the transaction, core 102 makes transactional changes (e.g., transactional writes to memory locations, state changes, etc.), which were prevented from effecting the architectural state of processor 100 during the transaction, visible to other entities on processor 100, thereby committing the changes to the architectural state of processor 100. Otherwise, if the transaction is not complete (i.e., if the instruction was not the last instruction in the critical section), core 102 returns to step 904 to proceed to a next instruction in the transaction.

Figure 10:
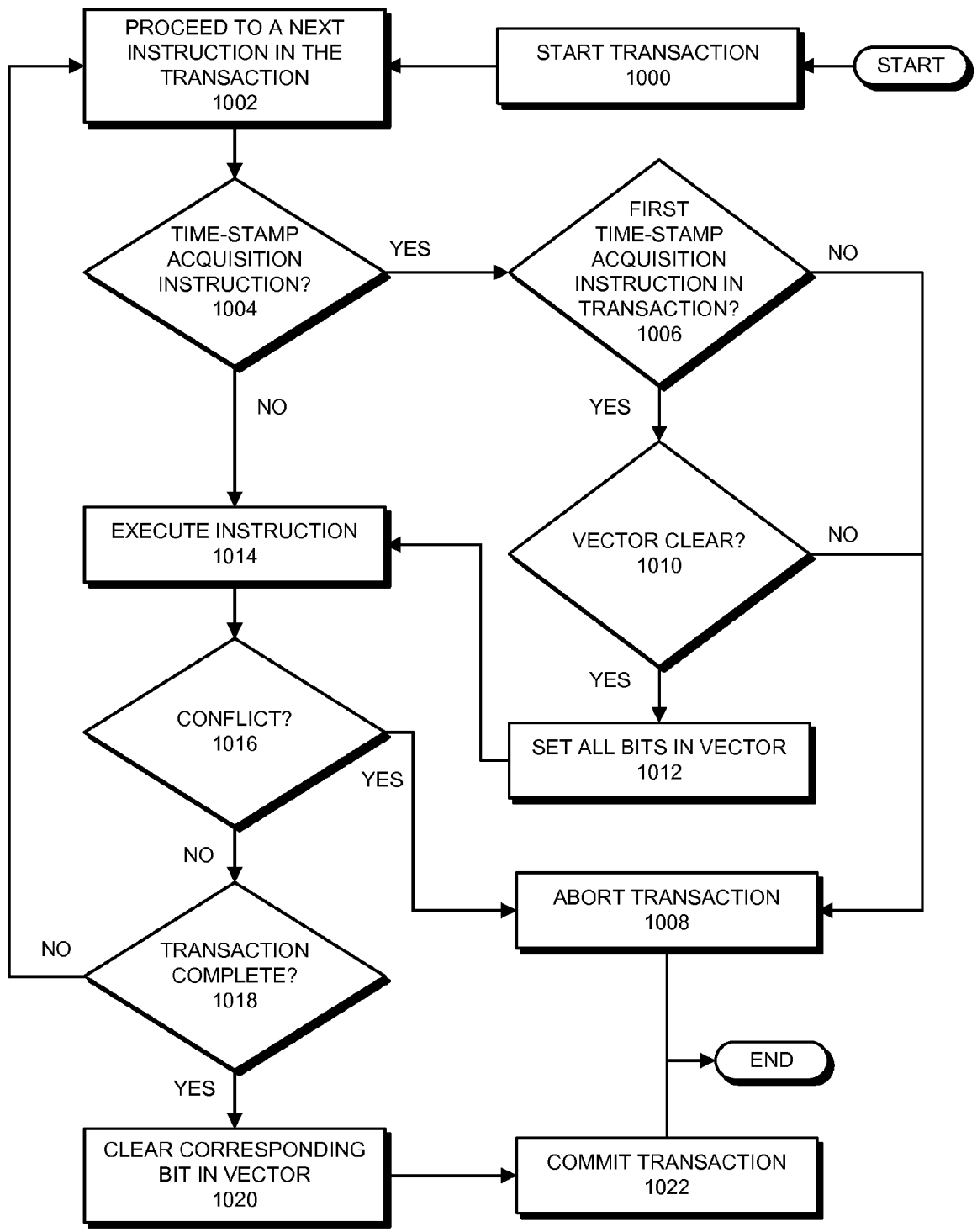
FIG. 10 presents a flowchart illustrating a process for executing a transaction in the presence of time-stamp acquisition instructions in accordance with some embodiments.

FIG. 10 presents a flowchart illustrating a process for executing a transaction in the presence of time-stamp acquisition instructions in accordance with some embodiments. The operations shown in FIG. 10 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. Moreover, the operations shown in FIG. 10 use a transaction time stamp indicator to keep a record of active transactions following the encounter of a time-stamp acquisition instruction in a transaction. The transaction time stamp indicator can be maintained in any suitable memory location (vector, scalar, etc.) in processor 100 from which a state of individual bits can be read/determined. For example, in some embodiments, a dedicated memory location is used to store a transaction time stamp vector that is used as the transaction time stamp indicator.

The process shown in FIG. 10 starts when core 102 in processor 100 starts a transaction (step 1000). As described above, in some embodiments, core 102 starts a transaction upon encountering a lock-acquiring instruction at the beginning of a critical section of program code. In some of these embodiments, HLE 126 (some or all of which can, as described above, be located within core 102) detects the lock-acquisition instruction and causes core 102 to start the transaction (and elide/ignore the lock-acquisition instruction). Thus, in these embodiments, during the transaction, core 102 executes instructions from the critical section in the transaction.

Core 102 then proceeds to a next instruction in the transaction (step 1002) and determines if the instruction is a time-stamp acquisition instruction (step 1004). If the instruction is a time-stamp acquisition instruction (step 1004), core 102 determines if the instruction is the first time stamp instruction in the transaction (step 1006). For example, if the instruction is a RDTSC, RDTSCP, or one or more other instruction(s) that cause core 102 to acquire a time stamp from time stamp counter 122, core 102 may determine if the instruction is the first time-stamp acquisition instruction in the transaction.

If the time-stamp acquisition instruction is not the first time-stamp acquisition instruction, core 102 aborts the transaction (step 1008). For example, when aborting the transaction, core 102 can halt processing instructions in the critical section, restore a pre-transactional state of processor 102 (e.g., register values, processor state variables, etc.), and re-try executing the critical section in a subsequent transaction. In some embodiments, upon aborting the transaction a given number of times (e.g., 1, 3, etc.), core 102 performs an error-handling routine, which may include executing the transaction using the above-described locks (i.e., returning to the default behavior of the program code in the critical section), or setting one or more forward-progress mechanisms to enable a next attempt at the transaction to complete, etc.

By aborting the transaction in this way, core 102 operates in accordance with at least some or all of the above-described constraints. For example, the third constraint is met because the transaction, when the second time stamp would have been acquired, is aborted, thereby avoiding the case where another transaction could be fully enclosed in the largest time-stamp interval for the transaction. The same is true for the fourth constraint.

Otherwise, if the time-stamp acquisition instruction is the first time-stamp acquisition instruction (step 1006), core 102 determines if the transaction time stamp vector (which is simply called "vector" in FIG. 10) is clear (step 1012). In some embodiments, the transaction time stamp vector comprises a number of bits equal to a maximum number of concurrent transactions in processor 100, with each bit representing an entity that executes the corresponding transaction (e.g., bit 0 representing core 102, bit 1 representing core 104, etc.). Thus, if processor 100 can support a maximum number of N concurrent transactions (N=4, 12, etc.) the transaction time stamp vector includes N bits. Generally, the transaction time stamp vector is used to indicate when an entity executing a transaction has encountered a time-stamp acquisition instruction to enable the operations shown in FIG. 10. In this description, when a bit in the transaction time stamp vector is set, the bit is equal to a first predetermined value such as 1, and when the bit is cleared, the bit is equal to a second predetermined value such as 0.

If the transaction time stamp vector is not clear (step 1010), and hence another transaction has set the bits in the vector (because that transaction encountered a time-stamp acquisition instruction), core 102 aborts the transaction (step 1008). By aborting the transaction in this way, core 102 operates in accordance with at least some or all of the above-described constraints. For example, the first constraint is met because the transaction, if another transaction has already acquired a time stamp, is aborted, thereby enforcing the constraint that the set of currently active transactions should not include more than one transaction that will commit successfully and includes a time-stamp acquisition instruction.

Otherwise, if the transaction time stamp vector is clear (step 1010), core 102 sets all the bits in the transaction time stamp vector (step 1012). As described above, setting the bits in this way serves to record that the transaction executing on core 102 has encountered a time-stamp acquisition instruction so that other entities on processor 100 (cores, threads, etc.) should abort if they encounter a time-stamp acquisition instruction during a transaction (until the transaction time stamp vector is cleared, as described below).

Core 102 then executes the instruction (step 1014). As described above, the instruction may be a time-stamp acquisition instruction, which causes core 102 to request a time stamp from time stamp counter 122. However, the instruction may be some other instruction from program code. For example, the instruction may be a memory access instruction or another instruction that causes a conflict for the transaction (step 1016) (e.g., a memory access instruction that interferes with another transaction, an instruction that causes an error that is handled by aborting the transaction, etc.), in which case, core 102 aborts the transaction (step 1008).

If the transaction is not complete (i.e., if the instruction was not the last instruction in the critical section) (step 1018), core 102 returns to step 1002 to proceed to a next instruction in the transaction.

Otherwise, if the transaction is complete, core 102 clears the corresponding bit in the transaction time stamp vector (step 1020). Recall that the transaction time stamp vector includes a bit for every entity in processor 100 that may execute a concurrent transaction. By clearing the bit as described (if the bit was set), core 102 records that the transaction is complete and is to be committed. Whether or not core 102 is the transaction that sets the bits, core 102 clears the corresponding bit in the vector. In this way, each transaction that commits after a transaction has set the bits in the transaction time stamp vector clears the corresponding bit. Only when the transaction time stamp vector is clear is another transaction enabled to set the bits in the vector—and thus enabled to execute a time-stamp acquisition instruction. As described above, this helps to prevent one or more of the constraints from being violated.

After clearing the corresponding bit in the transaction time stamp vector core 102 commits the transaction (step 1022). When committing the transaction, core 102 makes transactional changes (e.g., transactional writes to memory locations, state changes, etc.), which were prevented from effecting the architectural state of processor 100 during the transaction, visible to other entities on processor 100, thereby committing the changes to the architectural state of processor 100.

Figure 11A:
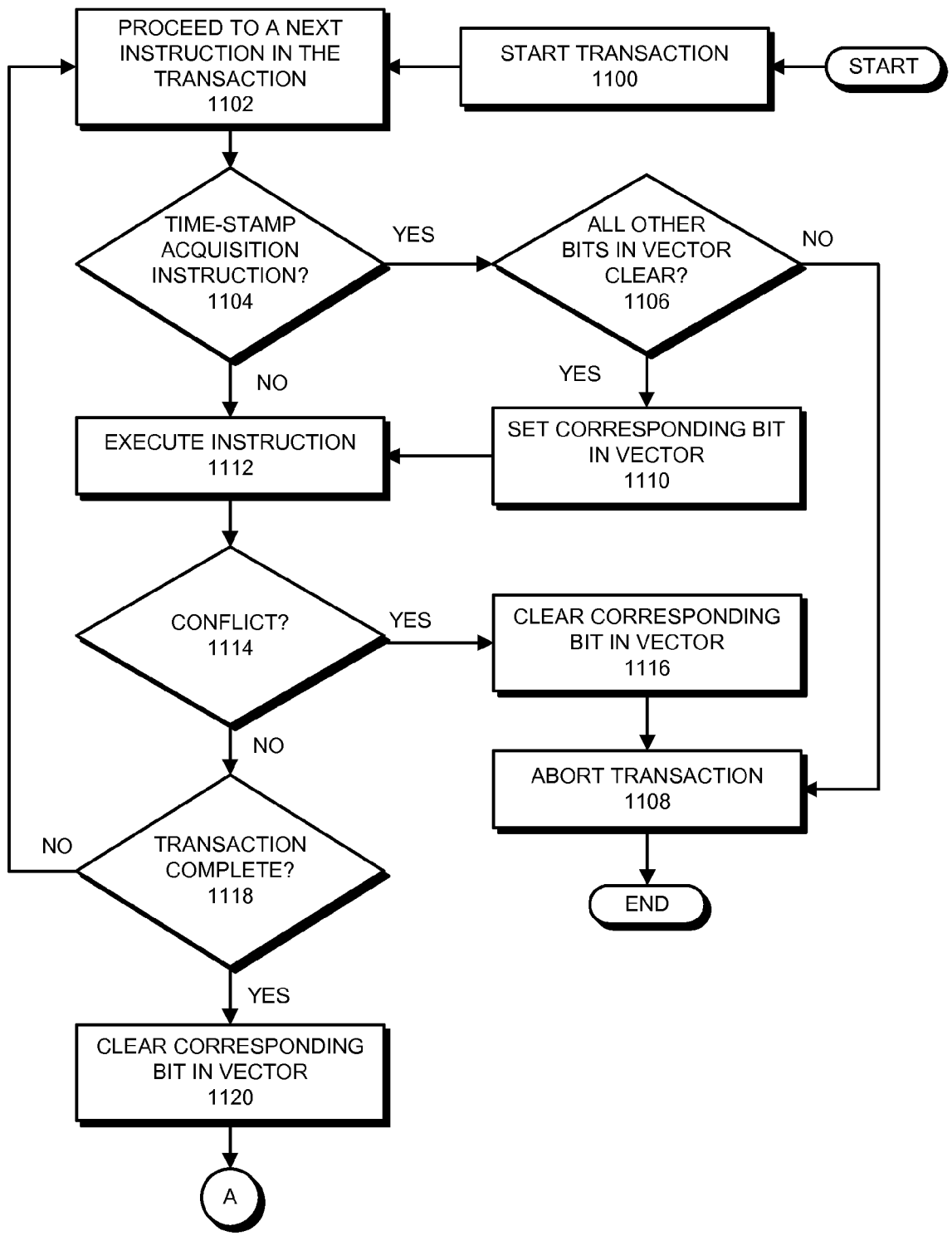
FIGS. 11A-11B (collectively "FIG. 11") present a flowchart illustrating a process for executing a transaction in the presence of time-stamp acquisition instructions in accordance with some embodiments.
Figure 11B:
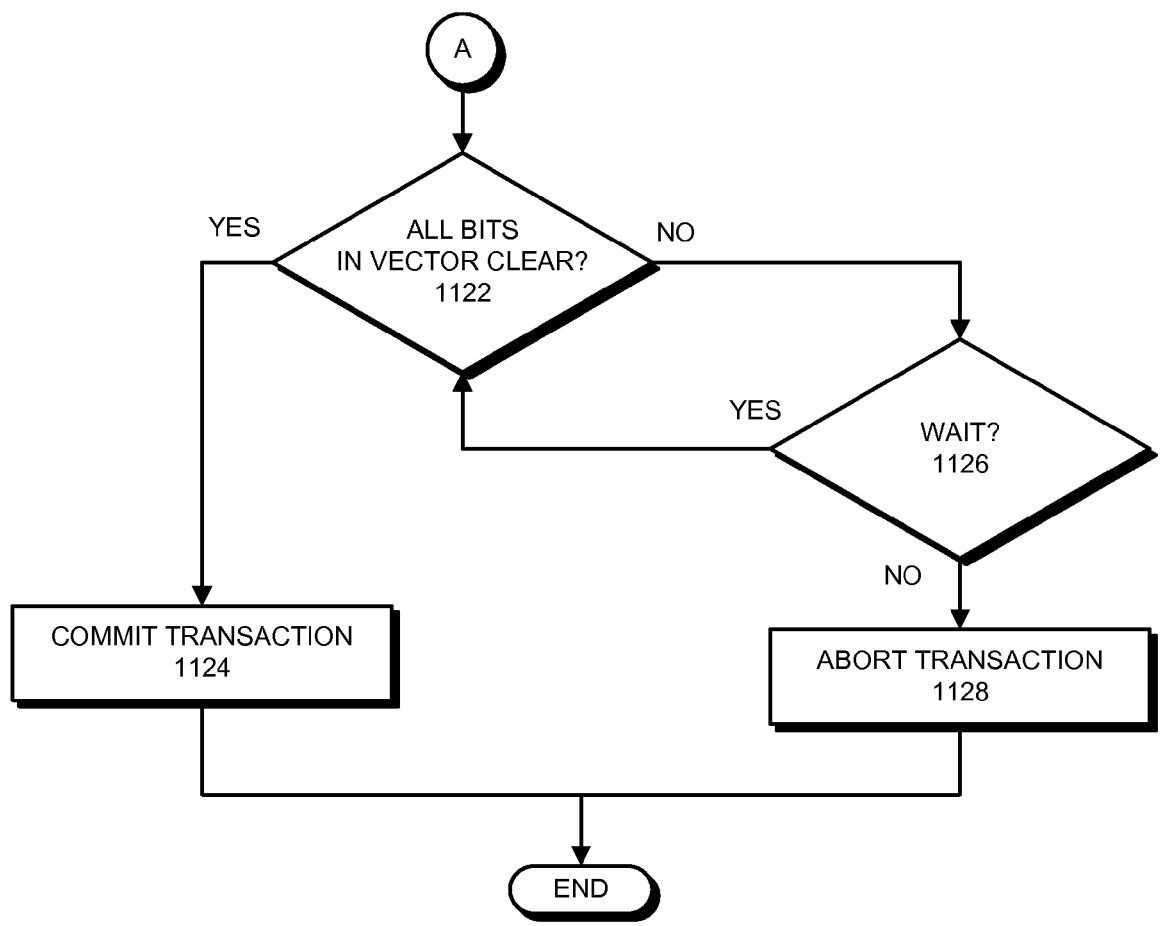

FIGS. 11A-11B (collectively "FIG. 11") present a flowchart illustrating a process for executing a transaction in the presence of time-stamp acquisition instructions in accordance with some embodiments. The operations shown in FIG. 11 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. Moreover, the operations shown in FIG. 11 use a transaction time stamp indicator to keep a record of active transactions following the encounter of a time-stamp acquisition instruction in a transaction. The transaction time stamp indicator can be maintained in any suitable memory location (vector, scalar, etc.) in processor 100 from which a state of individual bits can be read/determined. For example, in some embodiments, a dedicated memory location is used to store a transaction time stamp vector that is used as the transaction time stamp indicator.

The process shown in FIG. 11 starts when core 102 in processor 100 starts a transaction (step 1100). As described above, in some embodiments, core 102 starts a transaction upon encountering a lock-acquiring instruction at the beginning of a critical section of program code. In some of these embodiments, HLE 126 (some or all of which can, as described above, be located within core 102) detects the lock-acquisition instruction and causes core 102 to start the transaction (and elide/ignore the lock-acquisition instruction). Thus, in these embodiments, during the transaction, core 102 executes instructions from the critical section in the transaction.

Core 102 then proceeds to a next instruction in the transaction (step 1102) and determines if the instruction is a time-stamp acquisition instruction (step 1104). If the instruction is a time-stamp acquisition instruction (step 1104), core 102 determines if all other bits in the transaction time stamp vector (which is simply called "vector" in FIG. 11) are clear (step 1106). For example, if the instruction is a RDTSC, RDTSCP, or one or more other instruction(s) that cause core 102 to acquire a time stamp from time stamp counter 122, core 102 may determine if bits in the transaction time stamp vector other than a bit associated with core 102 are clear. In some embodiments, the transaction time stamp vector comprises a number of bits equal to a maximum number of concurrent transactions in processor 100, with each bit representing an entity that executes the corresponding transaction (e.g., bit 0 representing core 102, bit 1 representing core 104, etc.). Thus, if processor 100 can support a maximum number of N concurrent transactions (N=4, 12, etc.) the transaction time stamp vector includes N bits. Generally, the transaction time stamp vector is used to indicate when an entity executing a transaction has encountered a time-stamp acquisition instruction to enable the operations shown in FIG. 11. In this description, when a bit in the transaction time stamp vector is set, the bit is equal to a first predetermined value such as 1, and when the bit is cleared, the bit is equal to a second predetermined value such as 0.

Note that, unlike the processes shown in FIGS. 9 and 10, in the process shown in FIG. 11, there is no check (see, e.g., step 1006 in FIG. 10) to determine if the time-stamp acquisition instruction is the first time-stamp acquisition instruction (and, thus, there is no abortion of the transaction based on the check). This is true because the embodiment shown in FIG. 11 permits multiple time stamps to be acquired in a given transaction, as long as the remaining conditions shown in FIG. 11 are met. That is, a given transaction may acquire more than one time stamp, but other concurrent transactions should be aborted upon attempting to acquire a time stamp (i.e., after the given transaction acquires a time stamp), and other transactions should not be started until after a last time stamp for the given transaction. In these embodiments, a simple way to handle the second condition (i.e., the starting of subsequent transactions) is to prevent any transactions from starting until the given transaction commits. Another way to handle the second condition is that other transactions may be speculatively permitted to begin after a time stamp (essentially predicting that the time stamp is the last time stamp for the given transaction), but the other transactions should be aborted if the given transaction subsequently acquires a time stamp. In these embodiments, other transactions should not be allowed to commit until the given transaction commits, thereby holding the other transactions active to enable aborting the other transactions, should abortion become necessary. In this way, the third and fourth constraints are met for the embodiment shown in FIG. 11.

If at least one of the other bits in the transaction time stamp vector is set (and hence is not clear) (step 1106), core 102 aborts the transaction (step 1108). For example, when aborting the transaction, core 102 may halt processing instructions in the critical section, restore a pre-transactional state of processor 102 (e.g., register values, processor state variables, etc.), and re-try executing the critical section in a subsequent transaction. In some embodiments, upon aborting the transaction a given number of times (e.g., 1, 3, etc.), core 102 performs an error-handling routine, which may include executing the transaction using the above-described locks (i.e., returning to the default behavior of the program code in the critical section), or setting one or more forward-progress mechanisms to enable a next attempt at the transaction to complete, etc.

By aborting the transaction in this way, core 102 operates in accordance with at least some or all of the above-described constraints. For example, the first constraint is met because core 102 aborts the transaction to avoid acquiring a time stamp at a time when another transaction may has a prior time stamp and may commit. The fourth constraint is also met.

Otherwise, if the other bits in the transaction time stamp vector are clear (step 1106), core 102 sets a corresponding bit in the transaction time stamp vector (step 1110). In these embodiments, the corresponding bit is a bit in the transaction time stamp vector associated with core 102. Setting the corresponding bit as described serves to record that the transaction executing on core 102 has encountered a time-stamp acquisition instruction so that other entities on processor 100 (cores, threads, etc.) should abort if they encounter a time-stamp acquisition instruction during a transaction (until the transaction time stamp vector is cleared, as described below).

Core 102 then executes the instruction (step 1112). As described above, the instruction may be a time-stamp acquisition instruction, which causes core 102 to request a time stamp from time stamp counter 122. However, the instruction may be some other instruction from program code. For example, the instruction may be a memory access instruction or another instruction that causes a conflict for the transaction (step 1114) (e.g., a memory access instruction that interferes with another transaction, an instruction that causes an error that is handled by aborting the transaction, etc.), in which case, core 102 clears the corresponding bit in the transaction time stamp vector (step 1116) and aborts the transaction (step 1108).

By clearing the corresponding bit in the transaction time stamp vector as described when aborting the transaction, core 102 indicates to other entities on processor 100 that core 102 is no longer executing a transaction during which core 102 acquired a time stamp. When all bits in the transaction time stamp vector are cleared, an entity can set a corresponding bit and continue a transaction after acquiring a time stamp.

If the transaction is not complete (i.e., if the instruction was not the last instruction in the critical section) (step 1118), core 102 returns to step 1102 to proceed to a next instruction in the transaction. Otherwise, if the transaction is complete, core 102 clears the corresponding bit in the transaction time stamp vector (step 1120). By clearing the corresponding bit as described (if the bit was set), core 102 registers that the transaction is complete and is to be committed or aborted as described below.

Core 102 then determines if all of the bits in the transaction time stamp vector are clear (step 1122). In other words, core 102 determines if another entity in processor 100 is still engaged in a transaction during which a time stamp was acquired. If all of the bits in the transaction time stamp vector are clear, core 102 commits the transaction (step 1124). When committing the transaction, core 102 makes transactional changes (e.g., transactional writes to memory locations, state changes, etc.), which were prevented from effecting the architectural state of processor 100 during the transaction, visible to other entities on processor 100, thereby committing the changes to the architectural state of processor 100.

Otherwise, if all of the bits in the transaction time stamp vector are not clear (step 1122), and hence another entity in processor 100 is still engaged in a transaction during which a time stamp was acquired, core 102 determines if the commitment or abortion of the transaction should be delayed (step 1126). In this operation, core 102 determines if a predetermined time (e.g., 10 microseconds, 50 microseconds, etc.) should be allowed to pass and another check should be made to determine if all the bits in the transaction time stamp vector are cleared. If the decision is to wait, core 102 waits for the predetermined time and then returns to step 1122 to determine if all the bits in the transaction time stamp vector are clear. Otherwise, if the determination is not to wait, core 102 aborts the transaction (step 1128).

As described above, in some embodiments, a given transaction may acquire more than one time stamp, but other transactions should not be started until after a last time stamp for the given transaction. In these embodiments, other transactions may be speculatively permitted to begin after a time stamp, but these other transactions should be aborted if the given transaction subsequently acquires a time stamp. By delaying as described for step 1126, these embodiments provide an opportunity for all transactions to complete and clear the corresponding bits in the transaction time stamp vector. However, by possibly aborting after delaying a predetermined time, these embodiments ensure that a failed transaction for another entity does not leave a bit set indefinitely and thereby indefinitely hold up core 102 (i.e., when an entity is no longer executing a transaction, but has not cleared the corresponding bit in the transaction time stamp vector, such as with a crash or error in the other entity).

Figure 12A:
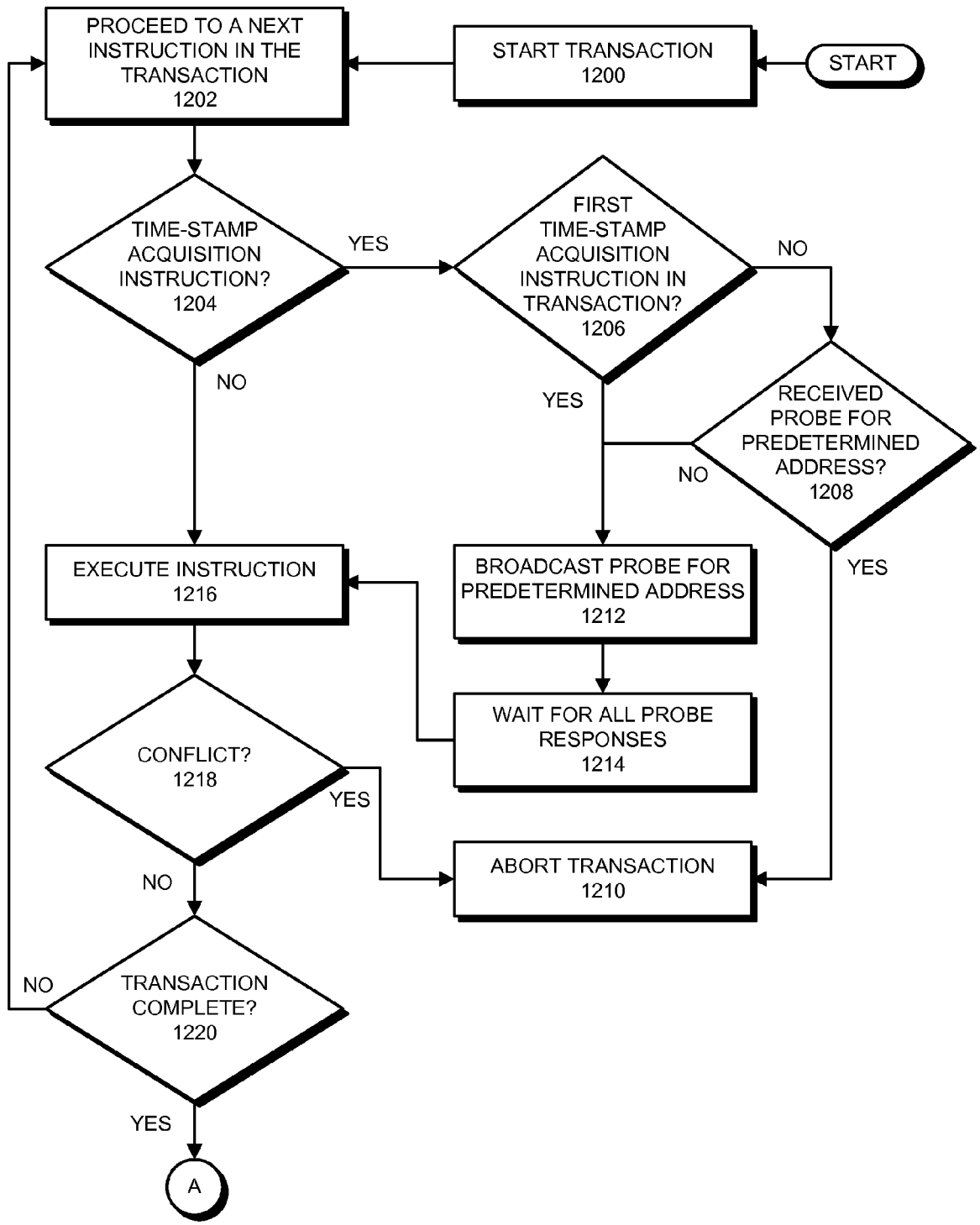
FIGS. 12A-12B (collectively "FIG. 12") present a flowchart illustrating a process for executing a transaction in the presence of time-stamp acquisition instructions in accordance with some embodiments.
Figure 12B:
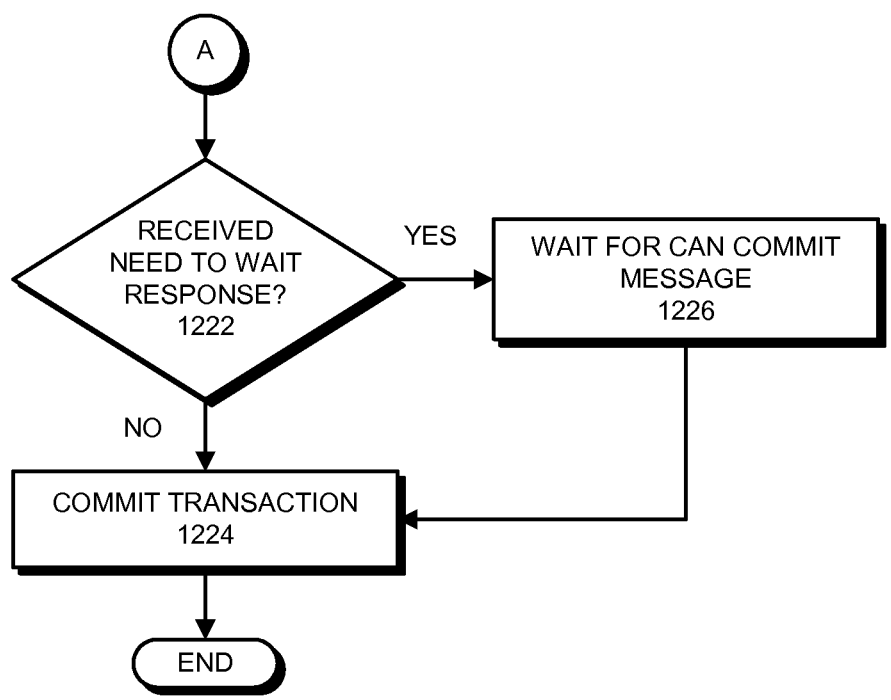

FIGS. 12A-12B (collectively "FIG. 12") present a flowchart illustrating a process for executing a transaction in the presence of time-stamp acquisition instructions in accordance with some embodiments. The operations shown in FIG. 12 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. Moreover, in the operations shown in FIG. 12, various messages are exchanged when executing a transaction. Generally, these messages (e.g., probes to a predetermined address, "can commit" messages, "need to wait" responses, etc.) can be implemented in any type of message/frame/packet that can be exchanged between entities (e.g., cores, threads, etc.) in processor 100.

Note that the embodiment shown in FIG. 12 permits multiple time stamps to be acquired in a given transaction, as long as the remaining conditions shown in FIG. 12 are met. Generally, in the embodiment shown in FIG. 12, entities on processor 100 can acquire any number of time stamps, as long as another entity on processor does not acquire time stamps between any two time stamps for the entity. In these embodiments, when executing a time-stamp acquisition instruction, the entities on processor 100 broadcast probes to a predetermined address, which can be any legal memory address that can be accessed by entities on processor 100. The probes indicate to other entities on processor 100 that a time-stamp acquisition instruction has been executed during a transaction by the corresponding entity. The entities on processor 100 monitor for such probes and use received probes to determine when a transaction should be aborted to avoid transactions that include overlapping time stamp intervals (which, as described above, may make violations of SLA apparent).

The process shown in FIG. 12 starts when core 102 in processor 100 starts a transaction (step 1200). As described above, in some embodiments, core 102 starts a transaction upon encountering a lock-acquiring instruction at the beginning of a critical section of program code. In some of these embodiments, HLE 126 (some or all of which can, as described above, be located within core 102) detects the lock-acquisition instruction and causes core 102 to start the transaction (and elide/ignore the lock-acquisition instruction). Thus, in these embodiments, during the transaction, core 102 executes instructions from the critical section in the transaction.

Core 102 then proceeds to a next instruction in the transaction (step 1202) and determines if the instruction is a time-stamp acquisition instruction (step 1204). For example, core 102 may determine if the instruction is a RDTSC, RDTSCP, or one or more other instruction(s) that cause core 102 to acquire a time stamp from time stamp counter 122.

If the instruction is a time-stamp acquisition instruction (step 1204), core 102 determines if the time-stamp acquisition instruction is the first time-stamp acquisition instruction in the transaction (step 1206). If the time-stamp acquisition instruction is not the first time-stamp acquisition instruction in the transaction (step 1206), core 102 determines if a probe for a predetermined address has been received (step 1208). If such a probe has been received, another entity in processor 100 has encountered one time-stamp acquisition instruction while executing a transaction and core 102 should not continue executing the transaction. For this reason, core 102 aborts the transaction (step 1210). By executing the transaction in this way, core 102 ensures that no overlapping time-stamp intervals can occur in processor 100.

If the time-stamp acquisition instruction is not the first time-stamp acquisition instruction in the transaction (step 1206) or if no probes have been received for the predetermined address (step 1208), core 102 broadcasts a probe for a predetermined address (step 1212). As described above, broadcasting the probe comprises sending a message to other entities in processor 100 that identifies the predetermined address (e.g., an address of a memory location). The other entities interpret the probe for the address as an indication that core 102 has encountered a time-stamp acquisition instruction during a transaction. In response, the other entities may send a probe response acknowledging the probe for the predetermined address or may send "need to wait" responses, as described below.

After broadcasting the probe for the predetermined address, core 102 waits for all the probe responses (step 1214). Specifically, core 102 waits for the above-described acknowledgement responses or "need to wait" responses from each other entity. Core 102 waits in this way to ensure that other entities have received the probe for the predetermined address. Note that core 102 stores or otherwise records "need to wait" responses and the entity in processor 100 from which they were received to enable step 1222.

Although not shown in FIG. 12, if core 102 does not receive all probe responses within a specified time, e.g., 20 microseconds, core 102 may perform a remedial action. For example, core 102 may abort the transaction, resend the probe for the predetermined address, send a probe for non-responding entities, and/or perform one or more other remedial actions.

Core 102 then executes the instruction (step 1216). As described above, the instruction may be a time-stamp acquisition instruction, which causes core 102 to request a time stamp from time stamp counter 122. However, the instruction may be some other instruction from program code. For example, the instruction may be a memory access instruction or another instruction that causes a conflict for the transaction (step 1218) (e.g., a memory access instruction that interferes with another transaction, an instruction that causes an error that is handled by aborting the transaction, etc.), in which case, core 102 aborts the transaction (step 1210).

If the transaction is not complete (i.e., if the instruction was not the last instruction in the critical section) (step 1220), core 102 returns to step 1202 to proceed to a next instruction in the transaction.

Otherwise, if the transaction is complete, core 102 determines if one or more "need to wait" probe responses were received from other entities (step 1222). In some embodiments, a "need to wait" response is sent from another entity in response to a probe from core 102 (see step 1212) when the other entity has executed a time-stamp acquisition instruction during a transaction (perhaps before the transaction executed by core 102 started). After receiving the "need to wait" response, core 102 waits for a "can commit" message from the other entity that indicates that the other entity has completed the corresponding transaction and hence core 102 "can commit" core 102's transaction. If one or more "need to wait" probe responses were received from other entities (step 1222), core 102 waits for corresponding "can commit" messages (step 1226) and then commits the transaction (step 1224) (or, although not shown, can abort the transaction if "can commit" messages are not received in a predetermined time such as 20 microseconds).

Otherwise, if no "need to wait" responses were received, core 102 commits the transaction (step 1224). When committing the transaction, core 102 makes transactional changes (e.g., transactional writes to memory locations, state changes, etc.), which were prevented from effecting the architectural state of processor 100 during the transaction, visible to other entities on processor 100, thereby committing the changes to the architectural state of processor 100.

Figure 13:
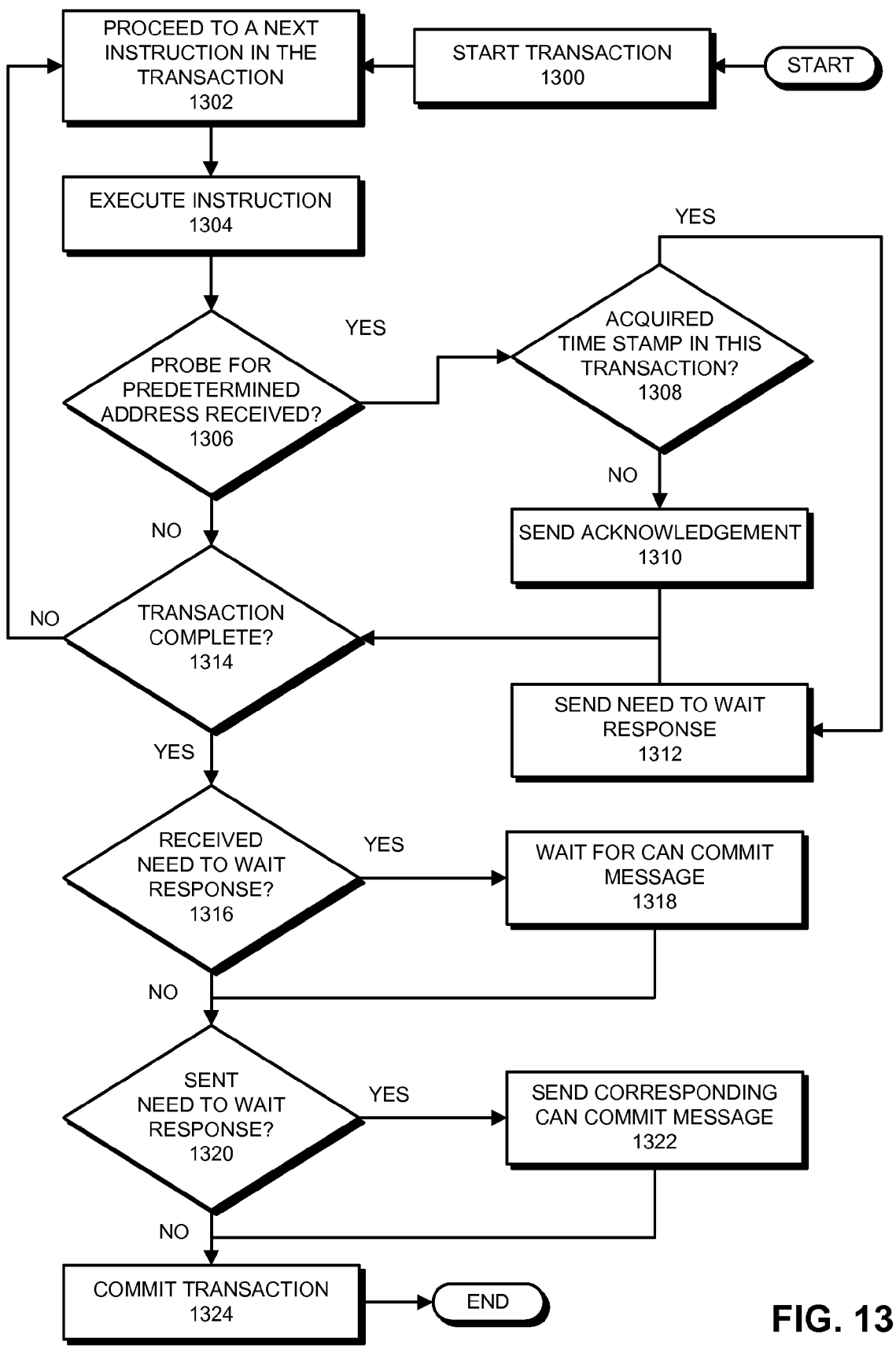
FIG. 13 presents a flowchart illustrating a process for executing a transaction in the presence of time-stamp acquisition instructions in accordance with some embodiments.

FIG. 13 presents a flowchart illustrating a process for executing a transaction in the presence of time-stamp acquisition instructions in accordance with some embodiments. The operations shown in FIG. 13 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. Moreover, in the operations shown in FIG. 13, various messages are exchanged when executing a transaction. Generally, these messages (e.g., probes to a predetermined address, "can commit" messages, "need to wait" responses, etc.) can be implemented in any type of message/frame/packet that can be exchanged between entities (e.g., cores, threads, etc.) in processor 100.

The embodiment shown in FIG. 13 is described from the perspective core 104 (which is an entity in processor 100 other than core 102) while core 102 carries on at least some of the operations shown in FIG. 12 (e.g., one or more of steps 1212, 1226, etc.). Although FIG. 13 is described using core 104, the other entity could be any core, thread, etc. in processor 100. Additionally, the operations performed by core 102 could be performed by another entity on processor 100. Generally, any two entities on processor 100 that can communicate as described could perform the actions of FIGS. 12-13. The embodiment shown in FIG. 13 permits multiple time stamps to be acquired in a given transaction (as initially described for FIG. 12), as long as the conditions shown in FIG. 13 are met.

The process shown in FIG. 13 starts when core 104 in processor 100 starts a transaction (step 1300). As described above, in some embodiments, core 104 starts a transaction upon encountering a lock-acquiring instruction at the beginning of a critical section of program code. In some of these embodiments, HLE 126 (some or all of which can, as described above, be located within core 104) detects the lock-acquisition instruction and causes core 104 to start the transaction (and elide/ignore the lock-acquisition instruction). Thus, in these embodiments, during the transaction, core 104 executes instructions from the critical section in the transaction.

Core 104 then proceeds to a next instruction in the transaction (step 1302) and executes the instruction (step 1304). While executing the instruction, core 104 monitors communications to determine if a probe for a predetermined address has been received (step 1306). As described above, core 102 broadcasts the probe for the predetermined address when executing a time-stamp acquisition instruction (see, e.g., step 1212).

If a probe for the predetermined address has been received (step 1306), core 104 determines if a time stamp has been acquired during the transaction (step 1308). In some embodiments, core 104 keeps a record (a register, an indicator bit, a variable, etc.) that indicates whether a time-stamp acquisition instruction has been encountered during the transaction (and, hence, a time stamp has been acquired) that is used to make the determination. If no time stamp has been acquired during the transaction (step 1308), core 104 sends an acknowledgement message that acknowledges the receipt of the probe (step 1310). The acknowledge message informs core 102 that core 104 has not executed a time-stamp acquisition instruction during the transaction, and thereby informs core 102 that it is permissible for core 102 to acquire a subsequent time stamp.

Otherwise, if a time stamp has been acquired during the transaction (step 1308), core 104 sends a "need to wait" response (step 1312). The "need to wait" response informs core 102 that core 104 has acquired at least one time stamp during the transaction. As described above, core 102 should not commit core 102's transaction until it can be sure that core 104 will not acquire a second time stamp (recall that core 102 acquiring a time stamp between two time stamps acquired by core 104 means that the time stamp acquired by core 102 overlaps a time stamp interval on core 104, which makes apparent a violation of SLA). For this reason, upon receiving the "need to wait" response, core 102 delays committing core 102's transaction until a "can commit" message is received in core 102 from core 104.

If the transaction is not complete (i.e., if the instruction was not the last instruction in the critical section) (step 1314), core 104 returns to step 1302 to proceed to a next instruction in the transaction.

Otherwise, if the transaction is complete, core 104 determines if a "need to wait" response was received (step 1316). The "need to wait" response described in step 1316 would have been received (from core 102 or another entity) in response to a probe for the predetermined address sent if a time stamp was acquired during core 104's transaction. When a "need to wait" response was received, core 104 waits for a corresponding "can commit" message (step 1318). The "can commit" message indicates to core 104 that the entity in processor 100 that sent the "need to wait" response has completed the corresponding transaction. It is therefore safe for core 104 to commit core 104's transaction (in that core 104 can no longer acquire a time stamp that overlaps with a time stamp interval for the other entity). Thus, for each "need to wait" response that was received (step 1316), core 104 waits for the corresponding "can commit" message (step 1318).

Next, if core 104 sent one or more "need to wait" responses (step 1320), core 104 sends corresponding "can commit" responses (step 1322). As described, these "can commit" responses indicate to the receiving entity that the receiving entity can safely commit a transaction without concern that core 104 will acquire a subsequent time stamp because core 104 is preparing to commit core 104's corresponding transaction.

Core 104 then commits core 104's transaction (step 1324). When committing the transaction, core 104 makes transactional changes (e.g., transactional writes to memory locations, state changes, etc.), which were prevented from effecting the architectural state of processor 100 during the transaction, visible to other entities on processor 100, thereby committing the changes to the architectural state of processor 100.

In some embodiments, instead of waiting/delaying the commit (see, e.g., steps 1226 and 1318), an entity in processor 100 may continue to execute program code beyond the end of the current transaction, adding the executed program code to the transaction (i.e., handling the execution of the program code as if it was originally part of the transaction). When the "can commit" message is eventually received, the entity handles the transaction as described. In some embodiments, this extension of the transaction is sustained for a limited time (e.g., 20 microseconds, etc.) before the transaction is aborted.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling operations during a transaction in a processor, wherein one or more attempts are made to acquire timestamps during the transaction, the method comprising:

monitoring acquisition of time stamps during the transaction, wherein each time stamp is acquired from a time stamp counter in the processor based on executing a corresponding time-stamp acquisition instruction; and preventing acquisition of a time stamp that meets a predetermined condition, the time stamp meeting the predetermined condition when the time stamp can be used to determine that one or more transactions executed concurrently, wherein the preventing comprises aborting the transaction or at least one other concurrent transaction when one or more time stamps and one or more operations in the transaction or the at least one other concurrent transaction make apparent an inconsistent ordering between the transaction and the at least one other concurrent transaction.

2. The method of claim 1, wherein aborting the transaction or at least one other concurrent transaction comprises:
aborting the transaction or at least one other concurrent transaction when one or more time stamps in the transaction form an overlapping interval with one or more time stamps in the at least one other concurrent transaction.

3. The method of claim 1, wherein aborting the transaction or at least one other concurrent transaction comprises:
when a time stamp has been acquired during the transaction and transactional results are to be committed to an architectural state of the processor, aborting at least one other concurrent transaction that has acquired or attempts to acquire a time stamp.

4. The method of claim 1, wherein aborting the transaction or at least one other concurrent transaction comprises:
aborting the transaction or at least one other concurrent transaction when two or more time stamps are acquired during the transaction and the at least one other concurrent transaction starts and finishes within a largest time-stamp interval during the transaction.

5. The method of claim 1, wherein aborting the transaction or at least one other concurrent transaction comprises:
aborting the transaction or at least one other concurrent transaction when two or more time stamps are acquired during the transaction and the at least one other concurrent transaction executes concurrently to a largest time stamp interval in the transaction.

6. The method of claim 1, further comprising:
when a time-stamp acquisition instruction is executed during the transaction in concurrent non-transactional execution, treating the time-stamp acquisition instruction as a concurrent transaction.

7. A core comprising one or more circuits for executing instructions, the core handling operations during a transaction, wherein one or more attempts are made to acquire timestamps during the transaction, wherein the core is configured to:
monitor acquisition of time stamps during the transaction, wherein each time stamp is acquired from a time stamp counter based on executing a corresponding time-stamp acquisition instruction; and
prevent acquisition of a time stamp that meets a predetermined condition, the time stamp meeting the predetermined condition when the time stamp can be used to determine that one or more transactions executed concurrently, wherein the preventing comprises aborting the transaction or at least one other concurrent transaction when one or more time stamps and one or more operations in the transaction or the at least one other concurrent transaction make apparent an inconsistent ordering between the transaction and the at least one other concurrent transaction.

8. The core of claim 7, wherein aborting the transaction or at least one other concurrent transaction comprises:
aborting the transaction or at least one other concurrent transaction when one or more time stamps in the transaction form an overlapping interval with one or more time stamps in the at least one other concurrent transaction.

9. The core of claim 7, wherein aborting the transaction or at least one other concurrent transaction comprises:
when a time stamp has been acquired during the transaction and transactional results are to be committed to an architectural state, aborting at least one other concurrent transaction that has acquired or attempts to acquire a time stamp.

10. The core of claim 7, wherein aborting the transaction or at least one other concurrent transaction comprises:
aborting the transaction or at least one other concurrent transaction when two or more time stamps are acquired during the transaction and the at least one other concurrent transaction starts and finishes within a largest timestamp interval during the transaction.

11. The core of claim 7, wherein aborting the transaction or at least one other concurrent transaction comprises:
aborting the transaction or at least one other concurrent transaction when two or more time stamps are acquired during the transaction and the at least one other concurrent transaction executes concurrently to a largest time stamp interval in the transaction.

12. The core of claim 7, wherein the core is further configured to:
when a time-stamp acquisition instruction is executed during the transaction in concurrent non-transactional execution, treat the time-stamp acquisition instruction as a concurrent transaction.

13. A processor that handles operations during a transaction, wherein one or more attempts are made to acquire timestamps during the transaction, comprising:
one or more cores;
a time stamp counter; and
a memory coupled to the one or more cores, wherein the memory is configured to store instructions and data for the one or more cores;
wherein at least one core is configured to:
monitor acquisition of time stamps during the transaction, wherein each time stamp is acquired from the time stamp counter based on executing a corresponding time-stamp acquisition instruction; and
prevent acquisition of a time stamp that meets a predetermined condition, the time stamp meeting the predetermined condition when the time stamp can be used to determine that one or more transactions executed concurrently, wherein the preventing comprises aborting the transaction or at least one other concurrent transaction when one or more time stamps and one or more operations in the transaction or the at least one other concurrent transaction make apparent an inconsistent ordering between the transaction and the at least one other concurrent transaction.

14. The processor of claim 13, wherein, aborting the transaction or at least one other concurrent transaction comprises:
aborting the transaction or at least one other concurrent transaction when one or more time stamps in the transaction form an overlapping interval with one or more time stamps in the at least one other concurrent transaction.

15. The processor of claim 13, wherein aborting the transaction or at least one other concurrent transaction comprises:
when a time stamp has been acquired during the transaction and transactional results are to be committed to an architectural state of the processor, aborting at least one other concurrent transaction that has acquired or attempts to acquire a time stamp.

16. The processor of claim 13, wherein, aborting the transaction or at least one other concurrent transaction comprises:
aborting the transaction or at least one other concurrent transaction when two or more time stamps are acquired during the transaction and the at least one other concurrent transaction starts and finishes within a largest timestamp interval during the transaction.

17. The processor of claim 13, wherein aborting the transaction or at least one other concurrent transaction comprises:
aborting the transaction or at least one other concurrent transaction when two or more time stamps are acquired during the transaction and the at least one other concurrent transaction executes concurrently to a largest time stamp interval in the transaction.

18. The processor of claim 13, wherein the core is further configured to:
when a time-stamp acquisition instruction is executed during the transaction in concurrent non-transactional execution, treat the time-stamp acquisition instruction as a concurrent transaction.

* * * * *